May 26, 1970  J. W. McCONNAUGHHAY  3,513,944
SHOPPING CART UNLOADING APPARATUS
Filed Sept. 18, 1968  4 Sheets-Sheet 1
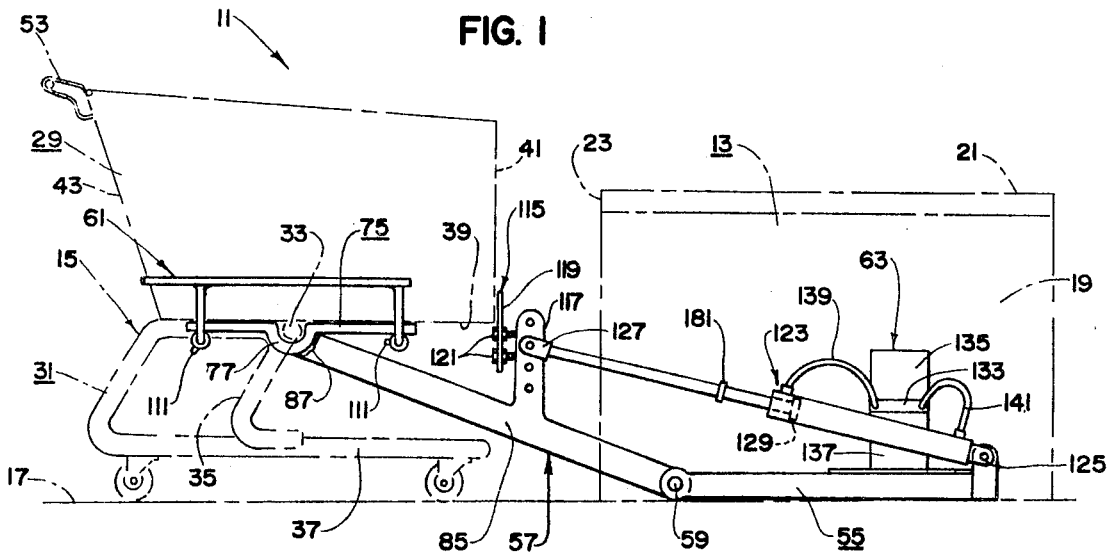
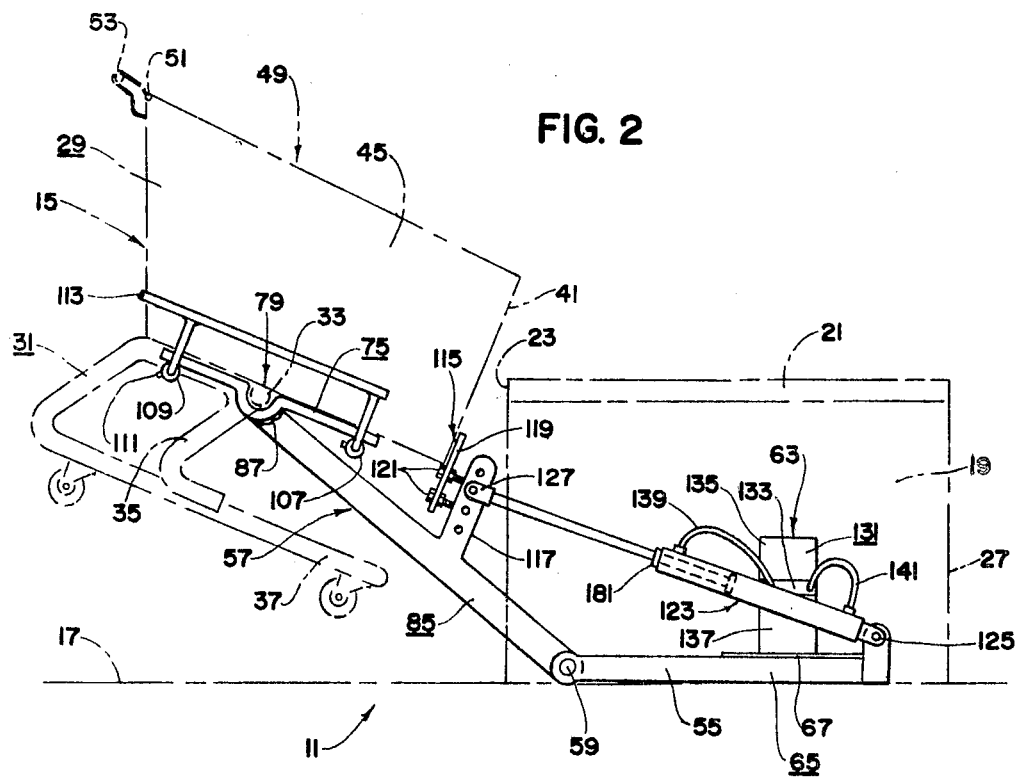
INVENTOR.
JARVIS W. McCONNAUGHHAY
BY John R. Walker, III
attorney May 26, 1970   J. W. McCONNAUGHHAY   3,513,944
SHOPPING CART UNLOADING APPARATUS
Filed Sept. 18, 1968   4 Sheets-Sheet 2
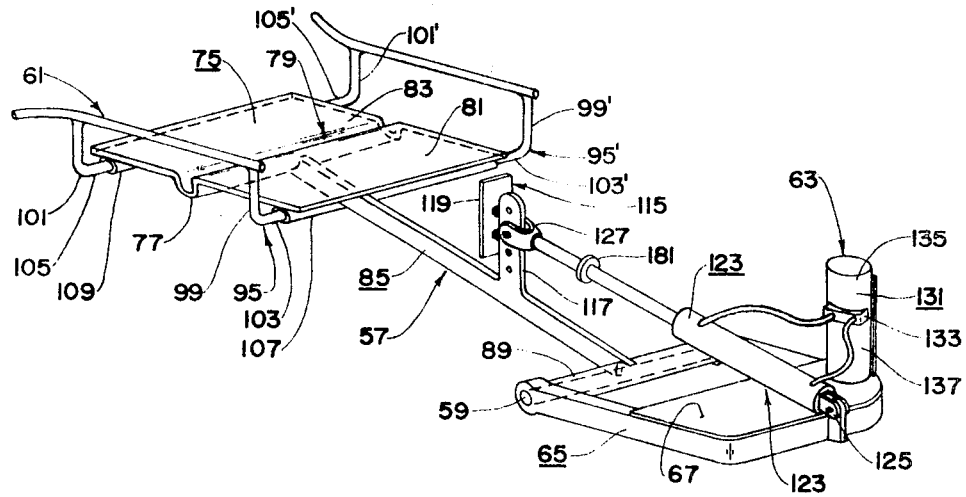
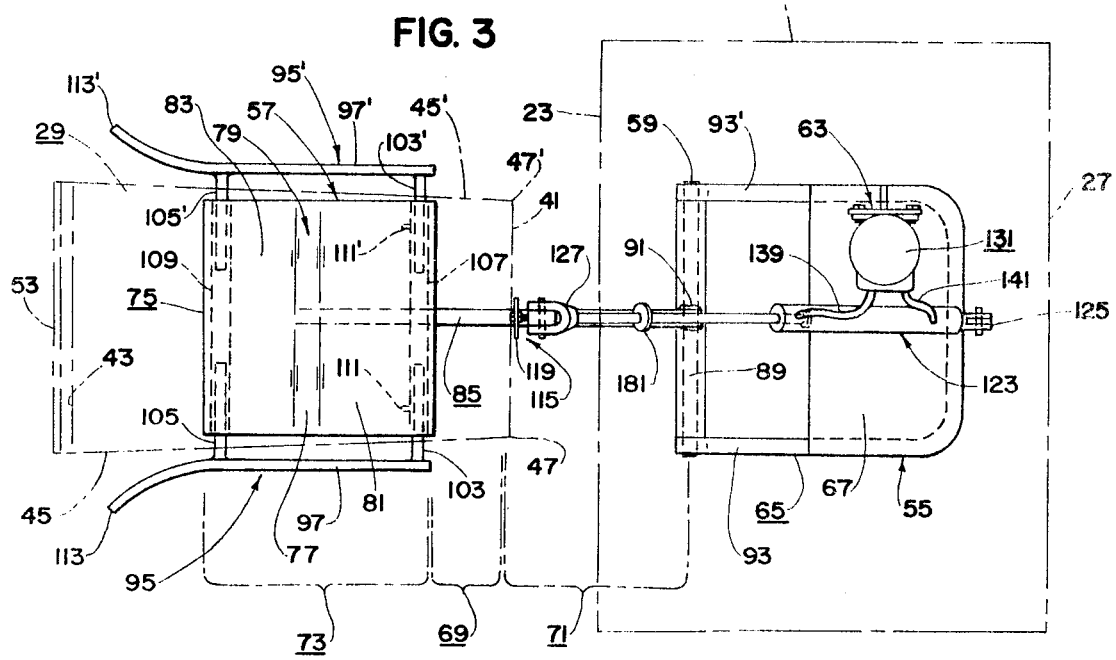
INVENTOR.
JARVIS W. McCONNAUGHHAY
BY John R. Walker, III
Attorney

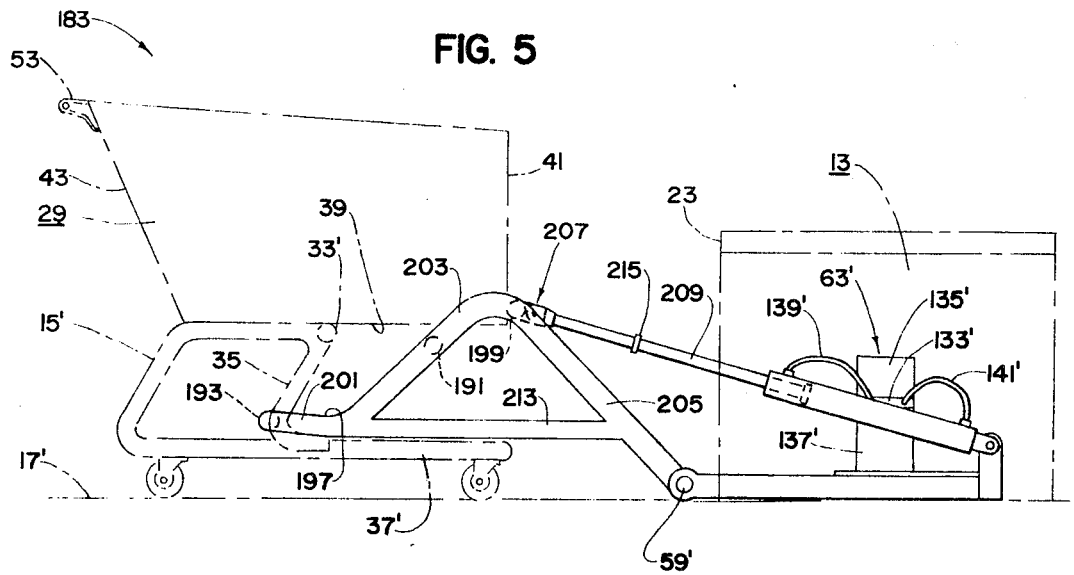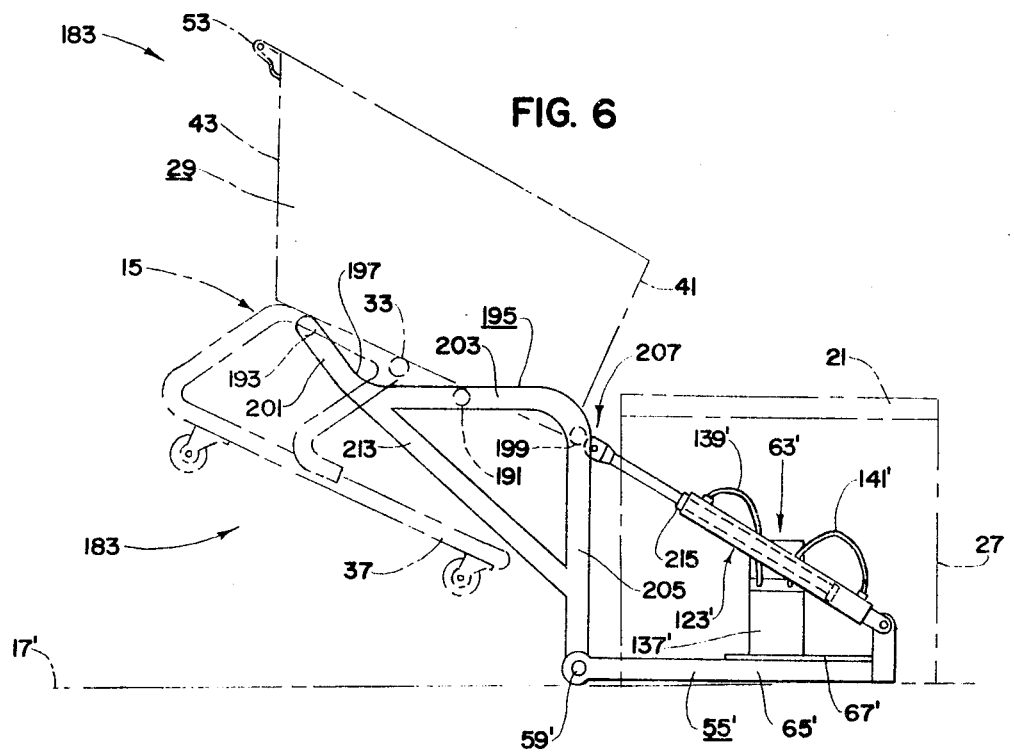

May 26, 1970     J. W. McCONNAUGHHAY     3,513,944

SHOPPING CART UNLOADING APPARATUS

Filed Sept. 18, 1968     4 Sheets-Sheet 4

INVENTOR.
JARVIS W. McCONNAUGHHAY
BY John R. Walker, III
Attorney

United States Patent Office 3,513,944
Patented May 26, 1970

3,513,944
SHOPPING CART UNLOADING APPARATUS
Jarvis W. McConnaughhay, 748 East St.,
Memphis, Tenn. 38104
Filed Sept. 18, 1968, Ser. No. 760,624
Int. Cl. E04h 3/04
U.S. Cl. 180—1  8 Claims

ABSTRACT OF THE DISCLOSURE

Apparatus for facilitating ready unloading of grocery shopping carts or merchandise shopping carts of self-service stores. The apparatus includes means for elevatingly tilting or bodily lift-tilting a shopping cart so that its fore and aft axis is tilted downwardly. The apparatus includes a pivotaly liftable carriage adapted to coactingly receive and lift a shopping cart. The carriage includes reach structure for pivotally moving a shopping cart in an upwardly sweeping arc thereby lift-tilting the basketed merchandise within easy reach of the checkout cashier.

BACKGROUND OF THE INVENTION

Field of the invention

Relates to apparatus useful for expediting the packaging and checkout services of a self-service type store.

Description of the prior art

Various self-service merchandising and checkout systems have heretofore been contemplated for expediting or improving services to customers and for more efficient merchandising.

Generally, prior art merchandising and checkout systems may be categorized in two broad groups: (1) Such checkout systems utilizing a somewhat typical nestable cart having an elevated basket fixedly mounted on a wheeled chassis in combination with lifting mechanism designed to accommodate and handle the existing typical shopping cart structure. Pat. No. 2,943,707 illustrates a checkout or shopping apparatus of this sort. (2) Checkout systems including novel shopping cart and counter structures and novel lifting means for expediting the removal of merchandise from the shopping cart. Pats. No. 3,205,976 and 3,219,148 illustrate shopping cart systems having novel cart, counter and lifting structures for expediting self-service merchandising.

A particular adverse feature of many prior art merchandising or checkout systems is that such systems are often complicated and very expensive to install and operate. This is particularly so if such systems do not utilize typical shopping cart structures which are nestable one cart structure into another cart structure. It is very apparent that a merchandising or checkout system utilizing a multiplicity of shopping carts which are not nestable generally may be considered not to be a workable checkout or merchandising system. Pat. No. 2,943,707 above mentioned, illustrates a shopping system utilizing a nestable shopping cart and vertical lift structure for lifting the cart in removing the merchandise from the cart basket. In Pat. No. 2,943,707 the desirable feature of utilizing a typical nestable cart is afforded; however, the basket front wall is hinged to permit downward movement and access into the interior of the basket and also the rearward basket interior is not readily accessible by the checkout cashier in unloading the merchandise items. Pats. No. 3,205,976 and 3,219,148 above mentioned, illustrate checkout structures which utilize means for tilting a shopping cart or a cart basket to facilitate unloading the basket. Pat. No. 3,219,148 includes structure for pivotally moving a basket laterally toward the cashier for access to the basket interior. Pat. No. 3,205,976 illustrates structure for pivotally tilting the shopping cart so that the fore and aft axis is tilted downwardly. The checkout apparatus in each of the above mentioned patents are generally complicated and are expensive to install and maintain. Moreover, the axis of tilt of each of the above mentioned cart tilting structures is arranged along the upper rim portion of the shopping cart basket structure and such elevated pivot axis substantially limits the elevational movement of each cart structure.

SUMMARY OF THE INVENTION

The shopping cart unloading apparatus of the present invention is adapted for use with a typical nestable shopping cart which is substantially currently universally utilized in grocery store merchandising. The cart unloading apparatus of the present invention is mechanically simple and substantially uncomplicated and of such design as to be readily installed in a typical grocery store utilizing a plurality of typical nestable shopping carts. The shopping cart unloading structure permits the shopping cart to be pivotally lifted and tilted simultaneously about an axis arranged generally below and at some distance from the shopping cart basket. Such design permits the basket of each shopping cart to be swung upwardly in a generally broad arc and to position the basketed merchandise material within easy reach of the checkout cashier. The apparatus provides for more efficient merchandising in a self-service store, particularly at the checkout cashier section of the store, and provides more efficient services to customers.

BRIEF DESCRIPTION OF THE DRAWINGS

FIG. 1 is a side elevational view of the shopping cart unloading apparatus of the present invention shown in a lowered disposition and in conjunction with a typical nestable shopping cart and counter structure (shopping cart and counter structure being shown in broken lines).

FIG. 2 is a side elevational view illustrating the shopping cart unloading apparatus in a raised disposition.

FIG. 3 is a top plan view of the shopping cart unloading apparatus illustrated in a lowered disposition.

FIG. 4 is a perspective view of the apparatus shown in a raised disposition and without the shopping cart or counter structures.

FIG. 5 is a side elevational view of a second embodiment of the cart unloading apparatus of the present invention shown in a lowered disposition.

FIG. 6 is a view similar to FIG. 5 illustrating the apparatus in a raised disposition.

DESCRIPTION OF THE PREFERRED EMBODIMENTS

Figure 7:
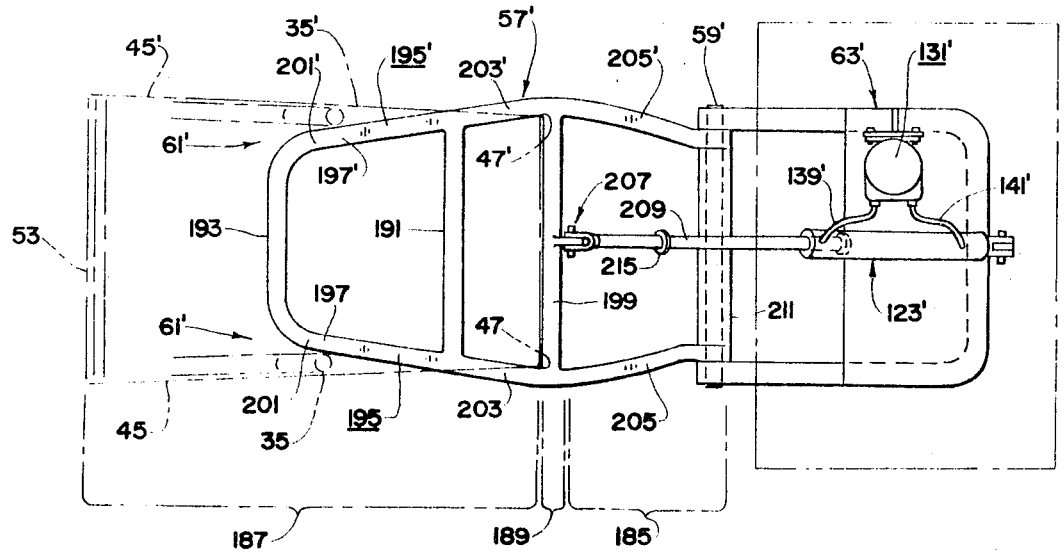
FIG. 7 is a top plan view of the second embodiment of the invention.

The first embodiment of the invention is illustrated in FIGS. 1–4 and 8 and is indicated by numeral 11. Shopping cart unloading apparatus 11 is illustrated and will be described in conjunction with typical counter structure 13 and shopping cart 15.

Checkout counter 13 is hollow generally rectangular and is supported on support or floor structure 17. The hollow body 19 of counter 13 supports a countertop 21 having an end edge 23. The cash register or cashier station may be adjacent right wall 25 or back wall 27 of counter body 19 in a typical arrangement.

Shopping cart 15 includes a somewhat rectangular basket 29 mounted on a wheeled chassis 31. Basket supporting structures including a horizontal support rod 33 and left and right vertical support rods 35, 35' (35' not shown) elevatingly support basket 29 about horizontal left and right chassis base rods 37, 37' (37' not shown). Basket 29 includes a generally horizontal bottom wall 39, front and back walls 41, 43 and forwardly converging left and right side walls 45, 45' intersection front wall 41 at vertical corners 47, 47'. Bottom wall 39 of basket 29 is firmly secured to shopping cart chassis 31 and defines a shopping cart basket carriage unit 29, 31 having an upwardly opening interior 49. Back wall 43 of basket 29 is dependingly hinged as indicated at 51 on a horizontal axis in typical fashion for permitting nestable action of one shopping cart with another shopping cart. Horizontal handle means 53 secured on the rearward upper portion of cart-basket 29 provides hand grip means for maneuvering shopping cart 15.

Embodiment 11 (FIGS. 1–4 and 8) primarily includes a horizontal base 55 supported on floor structure 17; a generally long carriage 57 supported on horizontal pivot pin 59 arranged on the forward edge of base structure 55; guide means 61 adapted for guidingly aligning shopping cart 15 over carriage 57; and power operative means for selectively moving carriage 57 toward and away from raised and lowered positions (see FIGS. 2 and 1). Base 55 basically includes a U-shaped portion 65 arranged horizontally and a plate portion 67 fixedly secured superjacently on the rearward portion of U-shaped portion 65. Base assembly 65, 67 is adapted to be permanently secured under countertop 21 on suitable supporting structure as floor structure 17 or at other suitable elevations by suitable fastening means (not shown). Carriage 57 is adapted to be pivotally moved upwardly and downwardly in a vertical plane and generally toward and away from the end edge 23 of countertop 21. Carriage 57 is generally shallow inverted V-shape in longitudinal vertical section and includes a horizontal transversely extending intermediate section 69 and proximal and distal sections 71, 73 extending respectively from opposite forward and rearward sides of intermediate section 69.

Distal section 73 of embodiment 11 includes a generally planar rest plate 75 adapted to supportingly engage the underside of shopping cart basket bottom wall 39 when elevatingly tilting cart 15. Rest plate 75 preferably is configured with a downwardly offset trough-like medial portion 77 defining an upwardly opening open ended recess 79 extending transversely across plate 75. Forward and rearward coplanar arranged plate portions 81, 83 of rest plate 75 are adapted to engage basket bottom wall 39 on opposite fore and aft sides of horizontal basket support rod 33 of wheeled chassis 31. Medial portion 77 or rest plate 75 is adapted to loosely subjacently span horizontal basket support rod 33 with the support rod being loosely received in upwardly opening trough-like recess 79.

Proximal section 71 of first embodiment 11 preferably includes a bar-like reach arm 85 pivotally secured at its proximal end on pivot pin 59 and fixedly secured in obliquely extending relationship on the underside transverse center portion of rest plate 75. Medial portion 77 and reach arm 85 are fixedly joined in a T-arrangement as indicated at 87. The bearing means pivotally supporting carriage 57 on base 55 includes a tubular hub 89 fixedly secured at its center portion 91 perpendicularly on the proximal end of reach arm 85. Pivot pin 59 loosely extends through tubular hub 89 and is fixedly secured at opposite end portions thereof to parallel horizontally extending projections 93, 93' of base structure 55.

Guide means 61 adapted for guiding shopping cart 15 over carriage 57 preferably includes a left and right guide rail assembly 95, 95' including respectively horizontal generally parallel arranged left and right guide rails 97, 97' and right angular support bracket structure supporting guide rails 97, 97' including forward and rearward left and right right angular support brackets 99, 101, 99', 101'. Each angular support bracket is arranged in a vertical plane lying transversely of carriage 57 and with a vertical portion fixedly secured to the undersurface of a respective guide rail 97, 97'. The paired converging horizontal portions 103, 105, 103', 105' of support brackets 99, 101, 99', 101' are telescopically fitted respectively in transversely extending tubular supports 107, 109 fixedly secured respectively subjacently to the undersurface of rest structure forward and rearward plate means 81, 83 of rest plate structure 75. Confrontingly corresponding guide rails assemblies 95, 95' are adapted to be convergingly or divergingly moved for providing the adjustment of the guide rail means to the horizontal width of a particular shopping cart 15. Transversely extending tubular supports 107, 109 preferably are provided with set screw means 111, 111' for dog engagement with horizontal bracket portions 103, 105, 103', 105' for centering guide rail assemblies 95, 95' laterally of carriage 57 and for adjustably fixing the distance between guide rails 97, 97'.

The forward end portions 113, 113' respectively of guide rails 97, 97' extend divergingly forwardly and function for laterally aligning carriage 57 and shopping cart 15 as cart basket 29 is moved over carriage distal section 73. Upon maneuvering shopping cart 15 into engagement with carriage distal portion 73, the opposite vertical corner edge portions 47 or 47' of front wall 49 engage diverging rail portions 113 or 113' and laterally align shopping cart basket 29 in longitudinal registry over carriage rest plate structure 75.

Abutment means 115 preferably is provided for longitudinally positioning cart 15 over carriage 57 and for stopping the forward movement of cart 15 at a position whereat horizontally extending basket support rod 33 of cart chassis 31 is arranged directly over recess 79 of rest plate medial portion 77. Such an arrangement is desired to cause support rod 33 to be received in recess 79 as carriage 57 raises and elevatingly tilts shopping cart 15. Adjustment means 115 preferably includes a vertically projecting lug 117 fixedly secured post-like on reach arm 85; an abutment plate 119 arranged transversely of reach arm 85; and adjustable threaded horizontal stud means 121 horizontally adjustably interconnecting plate 119 and lug projection 117. Turnably manipulating stud means 121 adjustably manipulates abutment plate 119 relative to rest plate structure 75 and provides adjustment means for stopping the forward travel of cart 15 at a location whereat support rod 33 of the cart is adapted to be loosely received in rest plate medial portion recess 79 as the shopping cart is elevatingly tilted.

Power operative means 63 adapted for raising and lowering carriage 57 preferably includes double-acting extendable-retractable piston-cylinder means 123; connection means 125, 127 arranged respectively on the base and rod end portions of piston-cylinder means 123 articulatingly interconnecting piston-cylinder means 123 between base structure 55 and lug portion 117 on reach arm 85. The means for providing controlled pressured fluid on opposite sides of piston 129 of piston-cylinder 123 preferably includes a hydraulic fluid supply unit 131 including a pump 133, a motor 135, and fluid reservoir means 137 for providing fluid to pump 133. First and second conduits 139, 141 interconnect respectively the output ports of pump 133 with the base and rod end portions of piston-cylinder means 123. Pump-motor means 133, 135 of pump unit 131 is bidirectionally operative and adapted for causing a bidirectional alternating flow of fluid simultaneously in conduits 139, 141 in extending and retracting piston-cylinder means 123.

Electro-mechanical selectively operable switch means 143 (see FIG. 8) is provided for causing pump-motor means 133, 135 to turn clockwise or counterclockwise to raise and lower carriage 57. The electrical circuit components of electro-mechanical switch means 143 is indicated by numeral 145 and includes starting and running windings 147, 149 of motor 135, a starting capacitor 151 arranged in series with starting winding 147, two single-pole double-throw switches 153, 155 operative for directing current through starting winding 147 and for causing motor 135 to turn in one or the other direction; and single-pole double throw switches 157, 159 operative respectively for starting and stopping motor 135.

Figure 8:
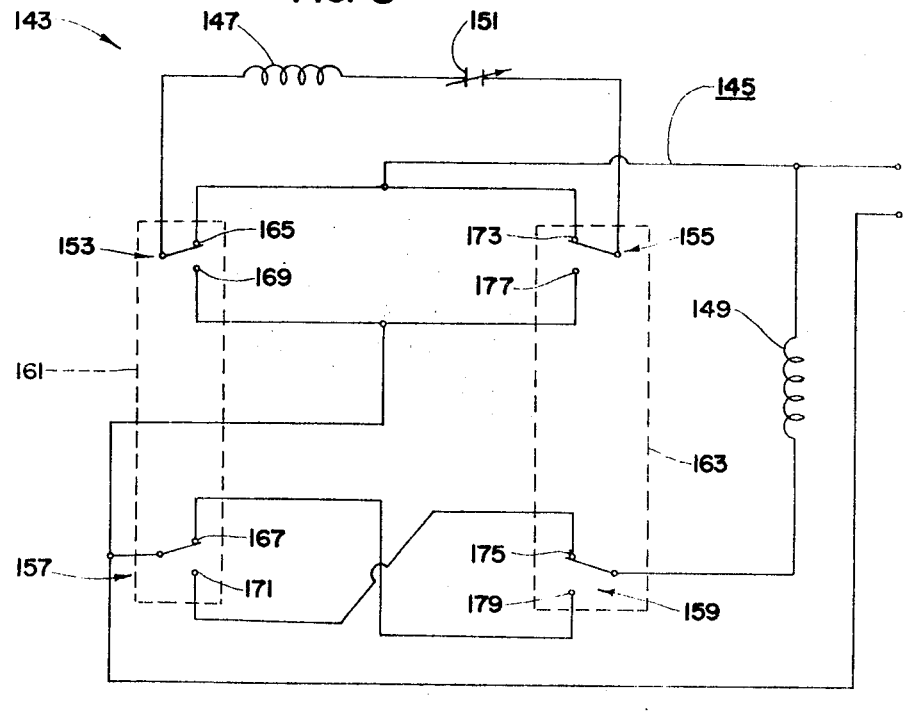
FIG. 8 is a schematic illustration of the electromechanical switch means of the apparatus.

Manually operative mechanical linkage means 161, 163 (indicated in broken lines) provide foot or hand operative means for actuating switches 153, 157; 155, 159 and for causing pump motor means 133, 135 to turn in a clockwise or counterclockwise direction. Linkage means 161 positively mechanically interconnects switches 153, 157 for simultaneous switch throw movement of the switches. Linkage means 163 positively mechanically interconnects switches 155, 159 and provides simultaneous switch throw means for these switches. Switches 153, 157 are spring-urged to a normal position as indicated in FIG. 8. Switches 155, 159 are likewise spring-urged to the normal position as indicated in FIG. 8. Upon manual actuation of linkage means 161, switches 153, 157 will be moved from terminals 165, 167 to terminals 169, 171. Likewise, manually actuating mechanical linkage means 163 from its normal spring-urged disposition simultaneously moves the switch contacts from terminals 173, 175 to terminals 177, 179. By selective manual actuation of either linkage means 161 or 163, pump motor means 133, 135 may be caused to turn in a clockwise or counterclockwise direction for selectively pivotally raising or lowering shopping cart supporting carriage 57.

A stop collar 181 is adjustably fixedly secured on the piston rod of piston-cylinder assembly 123 and limits the upward movement of carriage 57; axially adjustably manipulating collar 181 on rod 127 regulates the height of elevation of carriage 57 and thus shopping cart 15 (see FIGS. 1 and 2).

FIGS. 5–7 illustrate a second embodiment of the shopping cart unloading apparatus. Second embodiment 183 of the shopping cart unloading apparatus includes primary structure including base structure 55'; a carriage 57' pivotally supported from base structure 55' on a pivot pin 59'; guide means 61' adapted for guidingly aligning cart 15' over carriage 57'; and power operative means 63' adapted for moving carriage 57' towards and away from raised and lowered positions.

Base structure 55' includes a U-shaped bed portion 65' supported on floor structure 17' and includes piston-cylinder means 123', a hydraulic pump unit 131' connected with piston-cylinder means 123' by first and second bidirectional flow conduits 139', 141'. Electromechanical selectivity operable switch means (not shown) corresponding with switch means 143 of embodiment 11, is provided for selectively causing pump unit 131' to turn clockwise or counterclockwise in raising or lowering carriage 57'. The electro-mechanical switch means of embodiment 183 is the same as switch means 143 of embodiment 11 and such switch means shown in FIG. 8.

The shopping cart handling apparatus of second embodiment 183 is substantially the same as the cart handling apparatus of embodiment 11 and differs from embodiment 11 substantially only in structure and function of carriage 57' and guide means 61'. Therefore, carriage 57' and guide means 61' hereinafter will be described in detail, it will of course be understood that the remaining structure and function of embodiment 183 is the same as corresponding structure and function of embodiment 11.

Carriage 57' is generally long and inverted V-shaped and includes respectively proximal, distal and intermediate sections 185, 187, 189. Distal section 187 includes first and second horizontally arranged rest bars 191, 193 adapted to underlie and support respectively forward and rearward portions of shopping cart basket 29. Preferably carriages 57' is formed substantially of tubular material and includes left and right longitudinally extending stringers 195, 195' extending substantially the full length of carriage 57' from pivot pin 59' on the proximal end portion thereof to second rest bar structure 193 arranged on the terminal distal portion of carriage 57'. Preferably the distal end portions respectively of stringers 195, 195' integrally merge with second rest bar 193 in an upturned generally U-configured distal end portion of carriage 57'. The upturned end portion of carriage 57' defines left and right upwardly concave portions 197, 197' adapted respectively to subjacently span horizontal basket support rod structure 33 when carriage 57' is elevatingly supporting shopping cart 15 (see FIG. 6).

An abutment bar 199 extends horizontally and is fixedly secured between stringer structures 195, 195' at intermediate section 189 of carriage 57'. Abutment bar 199 is adapted to abuttingly engage front wall 41 of cart basket 29 and to stop the forward travel of cart 15 at a position whereat horizontal basket support rod 33 is arranged directly over left and right upwardly concave portions 197, 197' of left and right stringer structures 195, 195'. Abutment bar 199 is operative for stopping forward movement of shopping cart 15 at a position whereat upwardly concave stringer portions 197, 197' simultaneously loosely subjacently span basket support rod 33 and permit first and second rest bars 191, 193 to engage respectively forward and rearward portions of basket bottom wall 39 and to support shopping cart 15 in an elevated forwardly tilted disposition.

Guide means 61' includes structure common to stringer structures 195, 195' on distal section 189 of carriage 57'. Converging portions 201, 201' respectively of left and right stringer structures 195, 195' are adapted to engage respectively left and right vertical support rods 35, 35' of the shopping cart basket supporting structure (see FIG. 7). As shopping cart 15 is maneuvered into longitudinal alignment with carriage distal section 187, converging rod portions 201, 201' of carriage distal section 187 engage vertical basket support rod portions 35, 35' and function to shiftably align cart 15 over carriage 57' (see FIG. 7). Diverging portions 203, 203' engage forward vertically extending left and right corner edge portions 47, 47' of basket 29 as the shopping cart is maneuvered into engagement with carriage 57' and function to align the forward part of shopping cart 15 on carriage distal section 187 (see FIG. 7). Converging and diverging rod portions 201, 201'; 203, 203' simultaneously function for correspondingly laterally aligning shopping cart 15 and carriage distal section 187 as cart 15 is maneuvered into longitudinal alignment with the carriage distal section.

Reach arm portions 205, 205' of left and right stringer structures 195, 195' define substantially proximal section 185 of carriage 57'. Abutment bar 199 is addition to providing abutment means for shopping cart basket 29 also provides rigid cross member structure for pivotal anchor means 207 for the piston rod of piston-cylinder assembly 123'. Means 207 articulatingly connects distal end portion of piston-cylinder assembly rod 209 on the center portion of abutment bar 199. Pivot pin 59' loosely extends through tubular portion 211 of carriage proximal section 185 and pivotally supports the carriage from base structure 55' and for movement of the carriage between raised and lowered positions (see FIGS. 6 and 5). Left and right brace portions 213, 213' (213' not shown) preferably are provided for strengthening carriage distal section 187; brace portions 213, 213' interconnect respectively concave portions 197, 197' and reach arm portions 205, 205' for strengthening carriage structure 57'.

A stop collar 215 preferably is adjustably fixed on piston rod 209 for stopping the upward travel of shopping cart basket 29 at a desired elevation (see FIG. 6). Preferably, stop means is provided (as for example, by the engagement of the piston with the interior of the cylinder end) for limiting the downward pivotal movement of carriage 57' when there is not a shopping cart supported on the carriage. Preferably, carriage 57' is stopped in downward travel at a position whereat brace portions 213, 213' of the carriage are arranged generally parallel and slightly spaced above frame rods 37, 37' of shopping cart chassis 31 (see FIG. 5).

In using embodiment 11 or embodiment 183, the customer or user of a shopping cart will maneuver the cart into general longitudinal alignment with the carriage structure, and the cart is then moved forwardly to a stopped disposition while being correctly aligned by the guide means. The hydraulic pump means of the cart lifting apparatus is then actuated to cause the carriage to pivotally move upwardly to lift the basket to a tilted elevated disposition. After the merchandise items are removed from the basket, the hydraulic pump means is reactuated to cause the lift carriage and basket to move to a lowered disposition. The cart may then be moved rearwardly, disengaged from the cart unloading apparatus and maneuvered to a position for use by another customer.

I claim:

1. For use in a grocery or like business having a checkout countertop having an end edge and having a wheeled shopping cart having an elevated merchandise receiving basket or container having a generally flat bottom defining a downwardly oriented generally horizontal underside, a generally vertical front wall, a pair of oppositely oriented side walls and having basket support structure having a spaced apart pair of left and right vertical support rods, and including horizontal support rod structure substantially interconnecting the upper end portion of said pair of vertical support rods; the apparatus for elevatingly tilting said shopping cart for removing the merchandise items from the shopping cart basket comprising generally horizontal base structure adapted for stationary securement under said countertop, a generally long carriage having a horizontal transversely extending intermediate portion and having relatively obliquely extending proximal and distal portions extending respectively from opposite sides of said intermediate portion, means pivotally supporting said carriage from said base structure with said carriage being swingable upwardly and downwardly in a vertical plane and generally toward and away from the end edge of said countertop, said distal portion of said carriage being generally planar and perpendicularly arranged relative to a vertical datum plane, and said carriage including rest means adapted to supportingly engage the underside of said basket when said carriage is moved to its raised disposition, guide means for guidingly aligning said shopping cart basket over said carriage as said shopping cart is maneuvered into engagement with said carriage, and power operative means connected between said base structure and said carriage for selectively moving said carriage to and from raised and lowered positions; said shopping cart being adapted to be movably manipulated to a longitudinally aligned position relative to said carriage and with said shopping cart basket being arranged over said distal portion of said carriage, said carriage being adapted to be pivotally carried upwardly to an elevated tilted position toward the end edge of said countertop for ready removal of merchandise items from the shopping cart basket structure.

2. The apparatus of claim 1 wherein said power operative means for elevatingly tilting said shopping cart includes extendable-retractable, double-acting piston-cylinder means having opposite end portions directly articulatingly engaging said carriage and said base and including selectively reversible hydraulic pump-electric motor means having first and second pump output connections, first and second conduit means communicating respectively said first and second output connections with one and the other end of said piston-cylinder assembly, hydraulic fluid reservoir means for supplying fluid to said pump-motor means, and electro-mechanical selectively operable switch means for selectively causing said pump-motor means to turn clockwise or counterclockwise and for raising or lowering said carriage.

3. The apparatus of claim 1 wherein said carriage distal portion includes a generally planar rest plate having upper surface structure adapted to supportingly engage the underside of said shopping cart basket, and wherein said carriage proximal portion includes a single reach arm secured at its distal end portion to a substructive portion of said rest plate, and wherein the means pivotally supporting said carriage on said base includes an elongated hub fixedly secured at its center portion perpendicularly on the proximal end of said reach arm, and includes bearing means pivotally supporting said hub on a horizontal axis on said base.

4. The apparatus of claim 3 wherein said guide means for guidingly aligning said shopping cart over said carriage includes left and right coplanar arranged guide rails supported from said rest plate arranged symmetrically on opposite sides of the longitudinal vertical center plane of said carriage and arranged in a plane spaced parallel with and a short distance above the plane of said carriage rest plate, and wherein the horizontal interspatial spacing of said guide rails is such as to permit said guide rails to loosely engage oppositely facing sides of said shopping cart basket as said shopping cart is maneuvered into alignment with the carriage.

5. The apparatus of claim 3 wherein said generally planar rest plate structure includes structure defining forward and rearward rest plate half portions coplanar arranged and spaced paralllel apart and having structure defining downwardly offset, trough-like medial portion extending transversely of the longitudinal extension of said carriage distal portion and defining a transversely extending upwardly opening recess, the apparatus additionally including abutment means supported from said reach arm and adapted to abuttingly engage the outer structure of the vertical front wall of said cart basket and to stop the forward travel of said cart at a position whereat the horizontal basket support rod structure is arranged directly correspondingly over said medial portion upwardly opening recess; said cart being stopped by said abutment means at a position whereat, when said carriage is pivotally lifted, said rest plate structure medial portion recess will loosely receive said horizontal basket support rod structure of said cart.

6. The apparatus of claim 1 wherein said carriage distal section includes first and second rest bar means adapted to underlie and support respectively the forward and rearward portions of said shopping cart basket, and includes left and right support stringer means extending generally convergingly from said intermediate section horizontally toward the distal tip end of said distal section and relatively rigidly supporting said first and second rest bar means in generally parallel arrangement and crosswise of the vertical longitudinal center plane of said carriage, said guide means including structure common to said left and right support stringer means and defining left and right outwardly converging guide stringer structure adapted to simultaneously engage confronting inside surface portions respectively of the left and right vertical basket support rod structure of said carriage in guidingly aligning said shopping cart basket over said carriage.

7. The apparatus of claim 4 wherein said outwardly converging left and right guide stringer structure intersects oppositely extending left and right portions of said second rest bar means and said left and right guide stringer structures and rest bar means are generally U-configured and turned upwardly from said left and right support stringer means, the upturned U-configured portion of said carriage distal portion defining upwardly concave left and right stringer structure operatively adapted respectively to subjacently span said horizontal basket support rod structure as said shopping cart is elevatingly tilted.

8. The apparatus of claim 7 which additionally includes abutment means including a horizontal abutment bar fixedly extending transversely of said carriage at said intermediate carriage section, said abutment bar being adapted to abuttingly engage the outer side of said vertical front wall structure of said cart basket and to stop the forward travel of said cart at a position whereat the horizontal basket support rod structure of said cart is arranged directly over the upwardly concave left and right stringer structures, said shopping cart being stopped by said abutment means at a position whereat when said cart is pivotally lifted by engagement of said first and second carriage rest bars with the basket underside, said upwardly concave left and right stringer structures subjacently span said horizontal basket support rod structure.

References Cited
UNITED STATES PATENTS

| | | | |
|---|---|---|---|
| 3,205,976 | 9/1965 | Stollman | 186—1 |
| 3,443,665 | 5/1969 | Zschaeck | 186—1 |

HARVEY C. HORNSBY, Primary Examiner

U.S. Cl. X.R.

214—49